(12) United States Patent
Haar et al.

(10) Patent No.: US 6,708,432 B2
(45) Date of Patent: Mar. 23, 2004

(54) TEMPER EVIDENT EAR TAG SYSTEM

(75) Inventors: Kary Haar, Aberdeen, SD (US); Jeff Hanson, Aberdeen, SD (US); Dennis Volzke, Aberdeen, SD (US)

(73) Assignee: Cardinal Industries, Inc., Aberdeen, SD (US)

( * ) Notice: Subject to any disclaimer, the term of this patent is extended or adjusted under 35 U.S.C. 154(b) by 0 days.

(21) Appl. No.: 10/421,169

(22) Filed: Apr. 22, 2003

(65) Prior Publication Data
US 2003/0182831 A1 Oct. 2, 2003

Related U.S. Application Data

(63) Continuation-in-part of application No. 10/039,660, filed on Jan. 3, 2002, now abandoned.

(51) Int. Cl.⁷ .................................................. G09F 3/00
(52) U.S. Cl. ........................................... 40/301; 40/668
(58) Field of Search ........................... 40/300, 301, 668

(56) References Cited

U.S. PATENT DOCUMENTS

| | | | |
|---|---|---|---|
| 4,441,233 A | 4/1984 | Swift | 24/16 |
| 4,597,208 A | 7/1986 | Chevillot | 40/301 |
| 4,635,389 A | 1/1987 | Oudelette | 40/301 |
| 4,691,458 A | 9/1987 | Scott | 40/300 |
| 4,953,313 A | 9/1990 | Scott | 40/301 |
| 5,308,351 A | 5/1994 | Nehls | 606/116 |
| 6,095,915 A | 8/2000 | Geissler et al. | 452/198 |
| 6,385,877 B1 | 5/2002 | Wikan | 40/301 |
| 6,405,462 B1 | 6/2002 | Gardner et al. | 40/301 |

*Primary Examiner*—Gary Hoge
(74) *Attorney, Agent, or Firm*—Michael S. Neustel

(57) ABSTRACT

A tamper evident ear tag system for preventing reattachment of an ear tag to a second animal that was removed from a first animal. The tamper evident ear tag system includes an attachment member that is permanently inserted into a receiving member wherein the receiving member is attached to an ear tag. The attachment member is comprised of a main shaft, a flanged portion, and a spiked end that is inserted into the receiving member. The receiving member includes a first opening that extending inwardly within an inner flange for catchably receiving the spiked end of the attachment member.

19 Claims, 10 Drawing Sheets

TEMPER EVIDENT EAR TAG SYSTEM

CROSS-REFERENCE TO RELATED U.S. PATENT APPLICATION

I hereby claim benefit under Title 35, United States Code, Section 120 of U.S. patent application Ser. No. 10/039,660 filed Jan. 3, 2002. This application is a continuation-in-part of the Ser. No. 10/039,660 application. The Ser. No. 10/039,660 application is now abandoned. The Ser. No. 10/039,660 application is hereby incorporated by reference into this application.

BACKGROUND OF THE INVENTION

1. Field of the Invention

The present invention relates generally to animal ear tags and more specifically it relates to a tamper evident ear tag system for preventing reattachment of an ear tag to a second animal that was removed from a first animal.

Ear tags are a common method of identifying cattle and other types of livestock. Ear tags are also commonly utilized to identify animals that have received a specific type of vaccination that are required by certain states and countries. Ear tags are typically designed with a flat portion for receiving an indicia along with an extended member with a flanged portion attached to the distal end thereof that is inserted through the ear of an animal. Hence, there is a need for an ear tag system that cannot be easily removed from a first animal and reinserted into a second animal.

2. Description of the Prior Art

Conventional ear tags have been in use for years. Typically, conventional ear tags are typically designed with a flat portion for receiving an indicia along with an extended member with a flanged portion attached to the distal end thereof. To attach the conventional ear tag to the ear of the animal, the user must first utilize a knife or other sharp object to cut a slit within the ear. The user then spreads the slit apart and inserts the extended member with the flanged portion through and then allows the slit to close upon the extended member thereby retaining the ear tag within the ear of the animal.

The main problem with conventional ear tag devices is that they are easily removed by individuals and reinserted into another animal. Some individuals will remove an ear tag indicating a specific type of vaccination from an animal that is deceased and reinsert the ear tag into another animal that has not received the required vaccination thereby avoiding paying for the vaccination with the second animal. Another problem with conventional ear tag systems is that they are easily tampered with without detection by government authorities.

While these devices may be suitable for the particular purpose to which they address, they are not as suitable for preventing reattachment of an ear tag to a second animal that was removed from a first animal. Conventional ear tag systems are easily tampered with and reinserted into other animals without notice by authorities.

In these respects, the tamper evident ear tag system according to the present invention substantially departs from the conventional concepts and designs of the prior art, and in so doing provides an apparatus primarily developed for the purpose of preventing reattachment of an ear tag to a second animal that was removed from a first animal.

SUMMARY OF THE INVENTION

In view of the foregoing disadvantages inherent in the known types of ear tags now present in the prior art, the present invention provides a new tamper evident ear tag system construction wherein the same can be utilized for preventing reattachment of an ear tag to a second animal that was removed from a first animal.

The general purpose of the present invention, which will be described subsequently in greater detail, is to provide a new tamper evident ear tag system that has many of the advantages of the ear tags mentioned heretofore and many novel features that result in a new tamper evident ear tag system which is not anticipated, rendered obvious, suggested, or even implied by any of the prior art ear tags, either alone or in any combination thereof.

To attain this, the present invention generally comprises an attachment member that is permanently inserted into a receiving member wherein the receiving member is attached to an ear tag. The attachment member is comprised of a main shaft, a flanged portion, and a spiked end that is inserted into the receiving member. The receiving member includes a first opening that extending inwardly within an inner flange for catchably receiving the spiked end of the attachment member.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a tamper evident ear tag system that will overcome the shortcomings of the prior art devices.

A second object is to provide a tamper evident ear tag system for preventing reattachment of an ear tag to a second animal that was removed from a first animal.

Another object is to provide a tamper evident ear tag system that prevents individuals from deceiving government authorities.

An additional object is to provide a tamper evident ear tag system that allows authorities to detect tampering activities.

A further object is to provide a tamper evident ear tag system that makes it difficult to remove and reattach an ear tag.

Another object is to provide a tamper evident ear tag system that is of a simple construction and simple to utilize.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
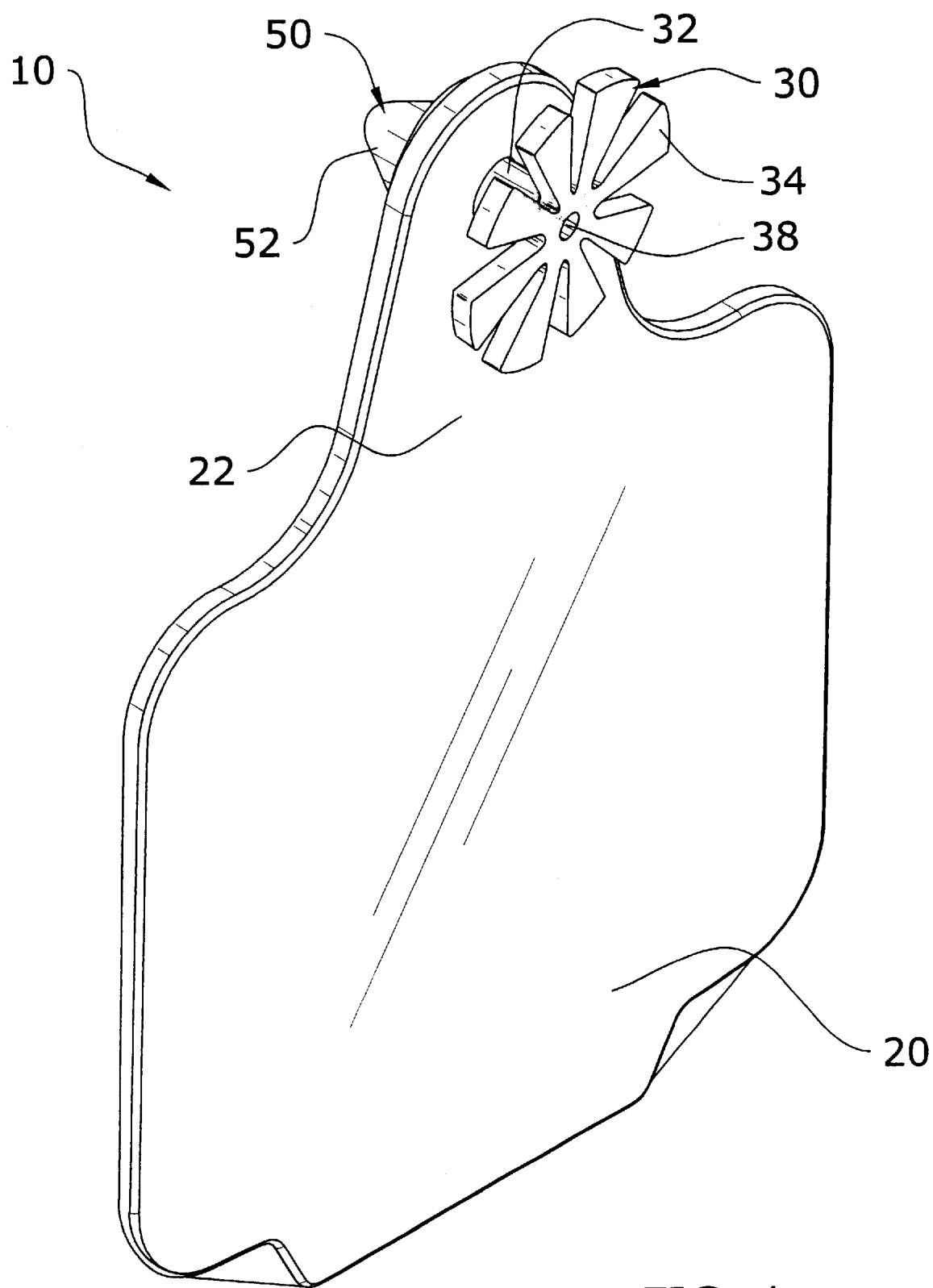
FIG. 1 is an upper perspective view of the present invention fully assembled.
Figure 2:
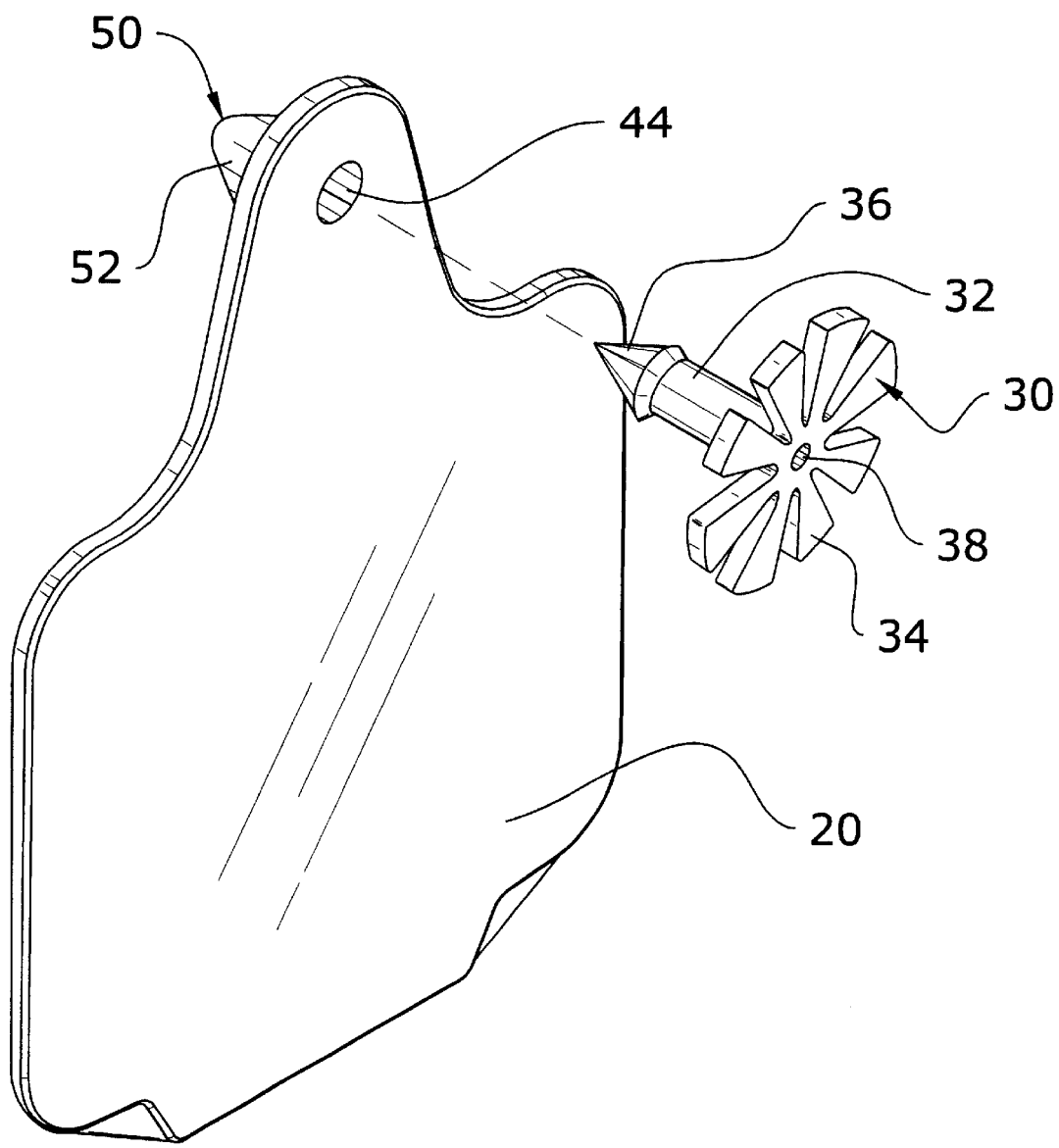
FIG. 2 is an exploded upper perspective view of the present invention.

Turning now descriptively to the drawings, in which similar reference characters denote similar elements throughout the several views, FIGS. 1 through 11 illustrate a tamper evident ear tag system 10, which comprises an attachment member 30 that is permanently inserted into a receiving member 60 wherein the receiving member 60 is attached to an ear tag 20. The attachment member 30 is comprised of a main shaft 32, a flanged portion 34, and a spiked end 36 that is inserted into the receiving member 60. The receiving member 60 includes a first opening 44 that extending inwardly within an inner flange 48 for catchably receiving the spiked end 36 of the attachment member 30.

As shown in FIGS. 4 through 10 of the drawings, the receiving member 60 is comprised of an enclosed structure. The receiving member 60 is preferably comprised of a first member 40 attached within a second member 50 to decrease manufacturing costs. The first member 40 and the second member 50 may be secured within a main opening 24 of the ear tag 20 by various attachment means. It can be appreciated that the receiving member 60 may be comprised of a single solid structure if desired.

The ear tag 20 may be comprised of various structures commonly utilized within the industry. The ear tag 20 typically includes a tapered neck 22 for attaching to the ear of an animal. A main opening 24 is within the neck 22 of the ear tag 20 for receiving the receiving member 60. It can be appreciated that the ear tag 20 and main opening 24 may be comprised of various structures and designs to accomplish the purpose of the present invention.

The ear tag 20 preferably has a first portion 26, a middle portion 27 and a second portion 28 that surround the receiving member 60 to prevent removal of the receiving member 60 from the ear tag 20. The receiving member 60 is preferably directly molded within the ear tag 20 during the molding of the ear tag 20. The first portion 26, middle portion 27 and second portion 28 may have various thicknesses. The first portion 26, middle portion 27 and second portion 28 preferably completely surround the receiver member 60 except for the main opening 24 and a portion of the body 52 of the second member 50.

Figure 5:
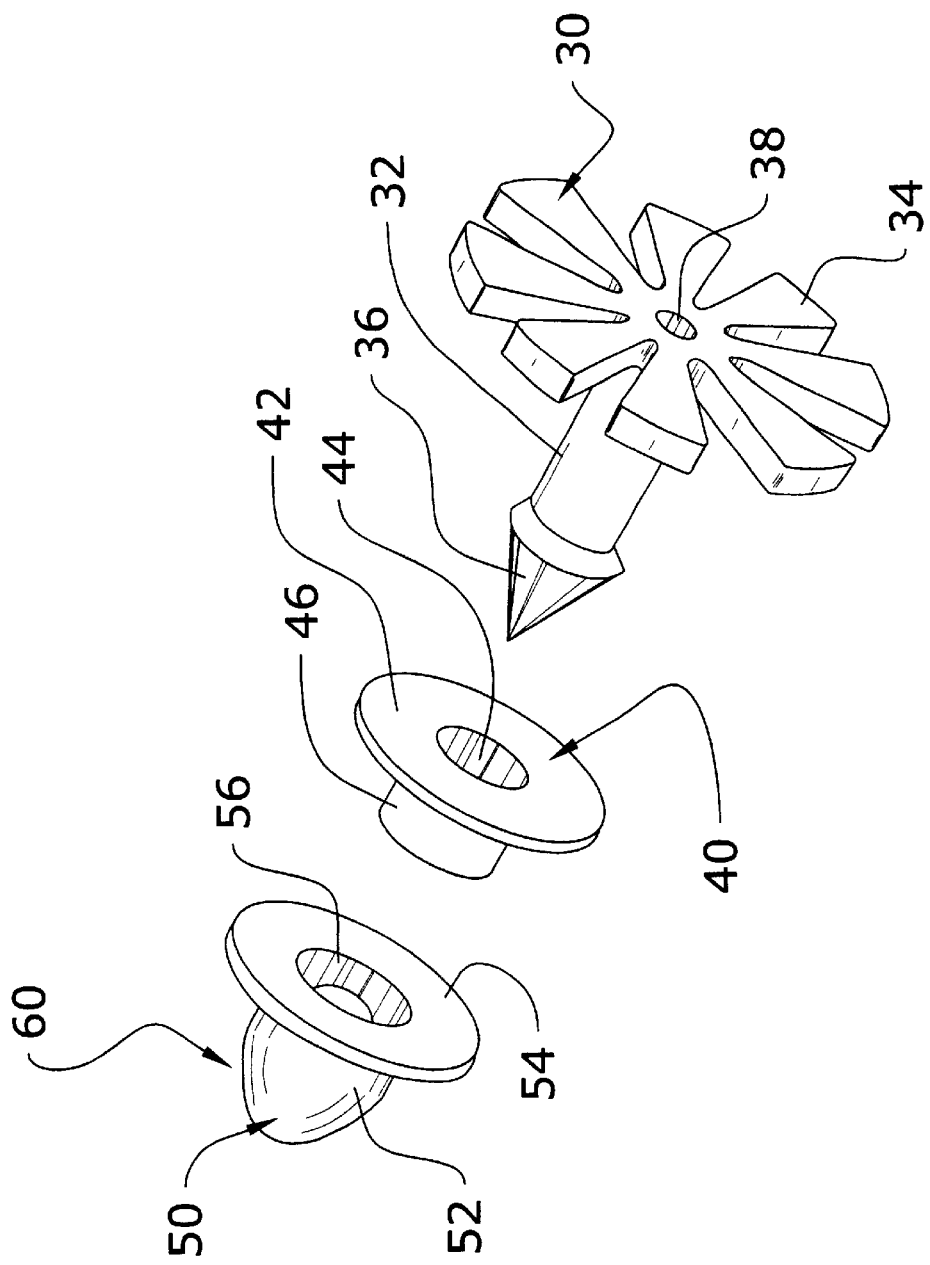
FIG. 5 is an exploded side cutaway view of the attachment member above the receiving member.
Figure 6:
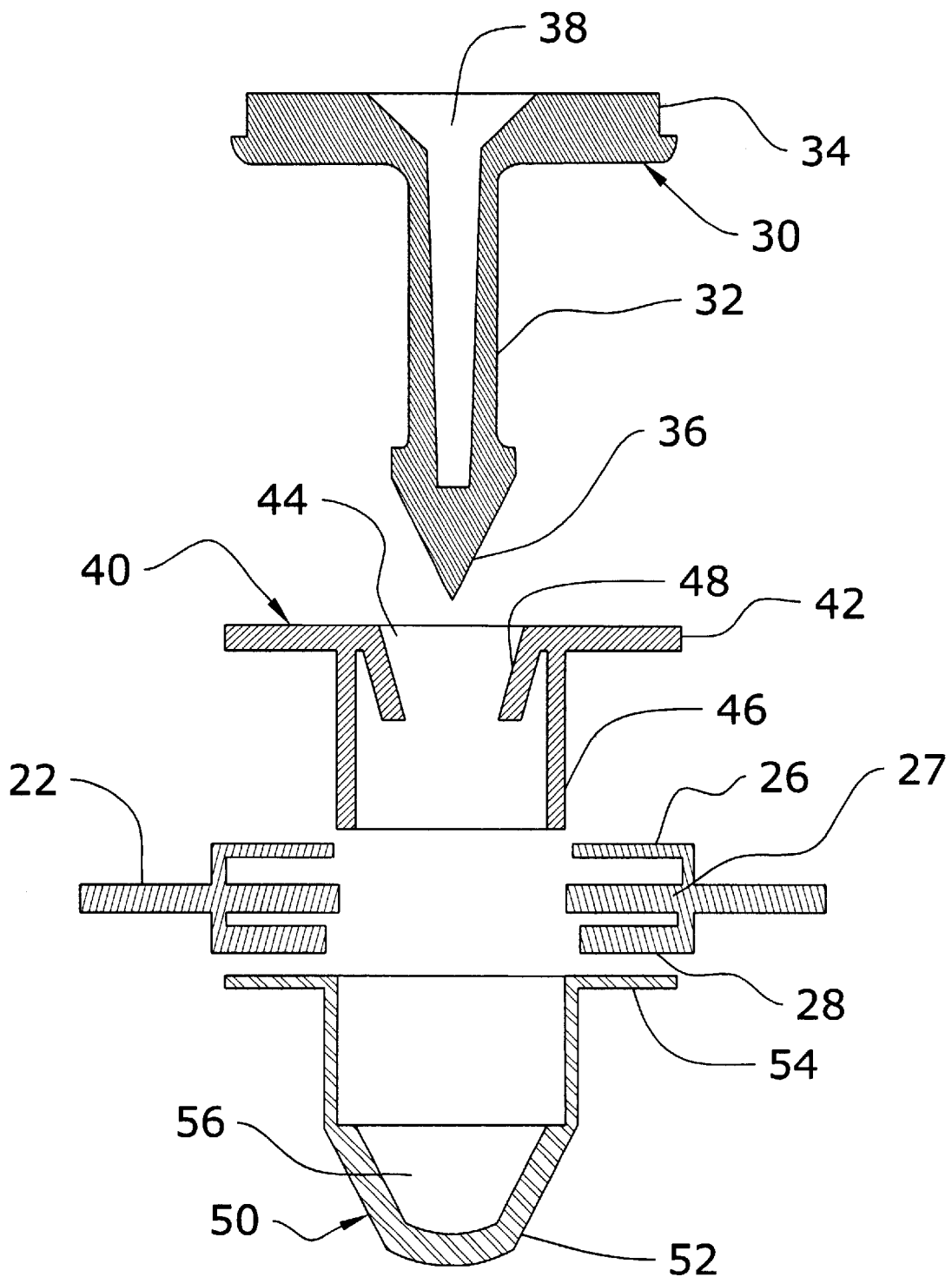
FIG. 6 is an exploded side cutaway view of the receiving member.
Figure 7:
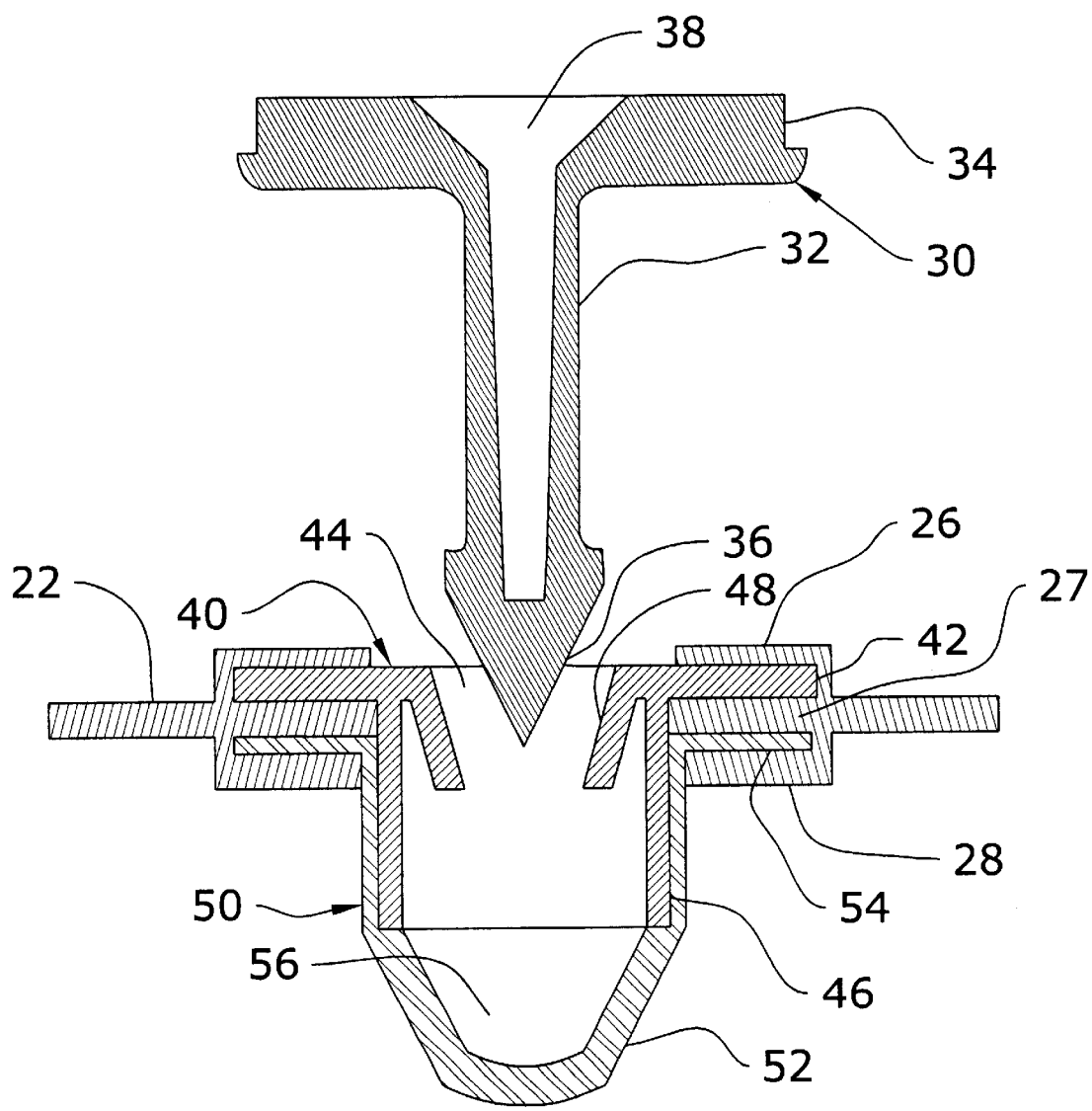
FIG. 7 is an exploded side cutaway view of the attachment member with respect to the receiving member.

As shown in FIGS. 4 through 10 of the drawings, the second member 50 is comprised of an enclosed body 52 with a second flange 54 extending about a perimeter thereof. The second member 50 includes a cavity 56 within for receiving a portion of the first member 40 and the attachment structure. The second member 50 preferably includes a concentric ridge 58 for providing alignment to the first member 40 as shown in FIG. 7 of the drawings. The second member 50 preferably has a circular cross sectional shape, however it can be appreciated that various other shapes may be utilized to construct the second member 50. In addition, the cavity 56 may be comprised of various configurations other than illustrated within the attached figures.

As shown in FIGS. 5 through 10 of the drawings, the first member 40 is formed for snugly fitting within the cavity 56 of the second member 50. The outer portion of the first member 40 is formed to fit snugly within the cavity 56 with the distal portion of the first member 40 preferably engaging the ridge 58 of the second member 50. The first member 40 may be attached within the second member 50 via various well-known means such as but not limited to adhesive, fasteners and heat applications. The first member 40 may be inserted through the main opening 24 of the ear tag 20 when being attached to the second member 50. As stated previously, the receiving member 60 may be comprised of a solid structure formed either directly or indirectly by the combining of the first member 40 within the second member 50.

The first member 40 includes an extended portion 46 and a first flange 42 surrounding an end thereof. The extended portion 46 is tubular in structure for receiving the attachment member 30 and is formed for being snugly positioned within the second member 50. A first opening 44 extends through the first flange 42 and the extended portion 46 of the first member 40 for receiving the main shaft 32 of the attachment member 30 as best shown in FIG. 5 of the drawings. The first opening 44 may be straight, curved or tapered for receiving the attachment member 30.

Figure 8:
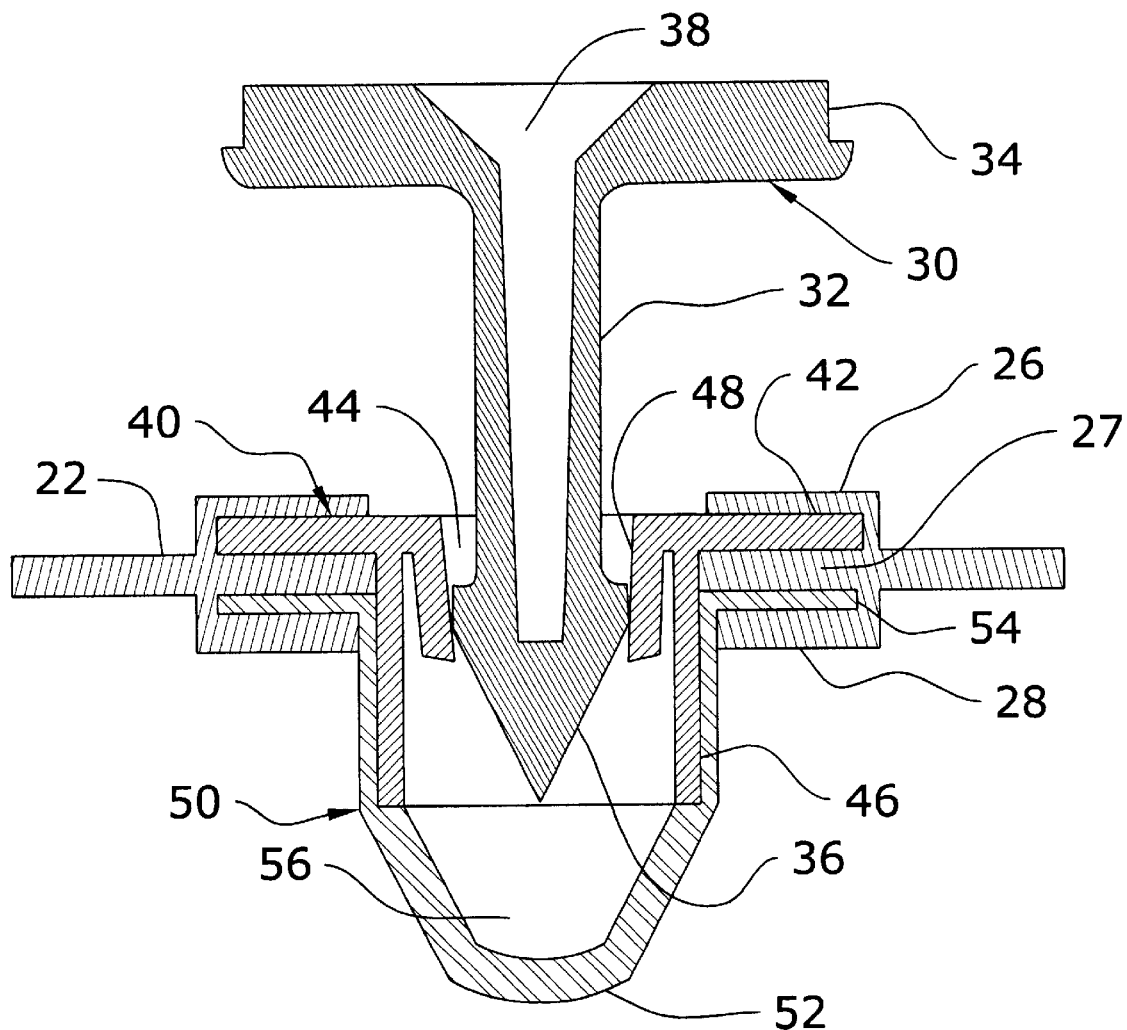
FIG. 8 is an exploded side cutaway view of the attachment member being partially inserted into the receiving member.
Figure 9:
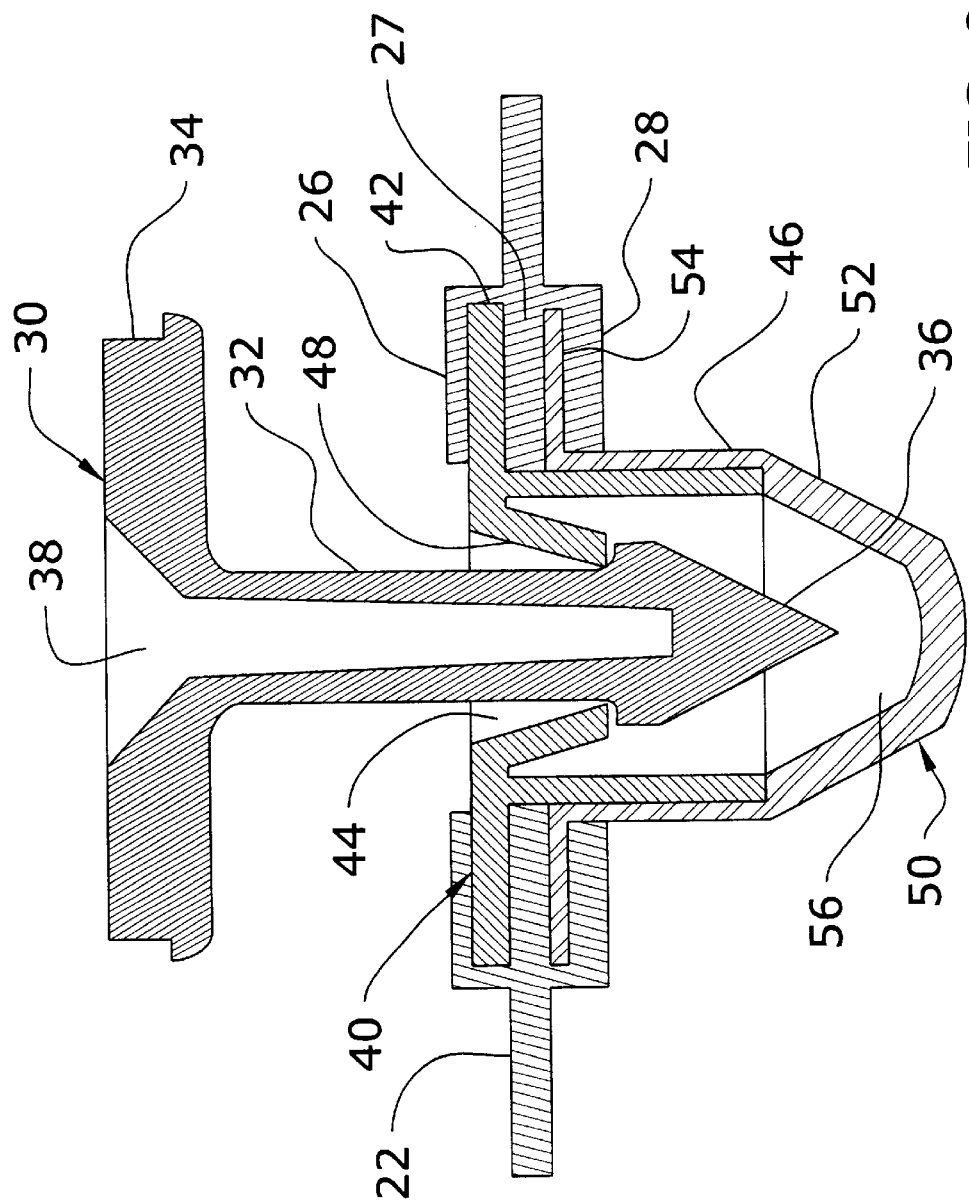
FIG. 9 is an exploded side cutaway view of the attachment member being fully inserted into the receiving member.
Figure 10:
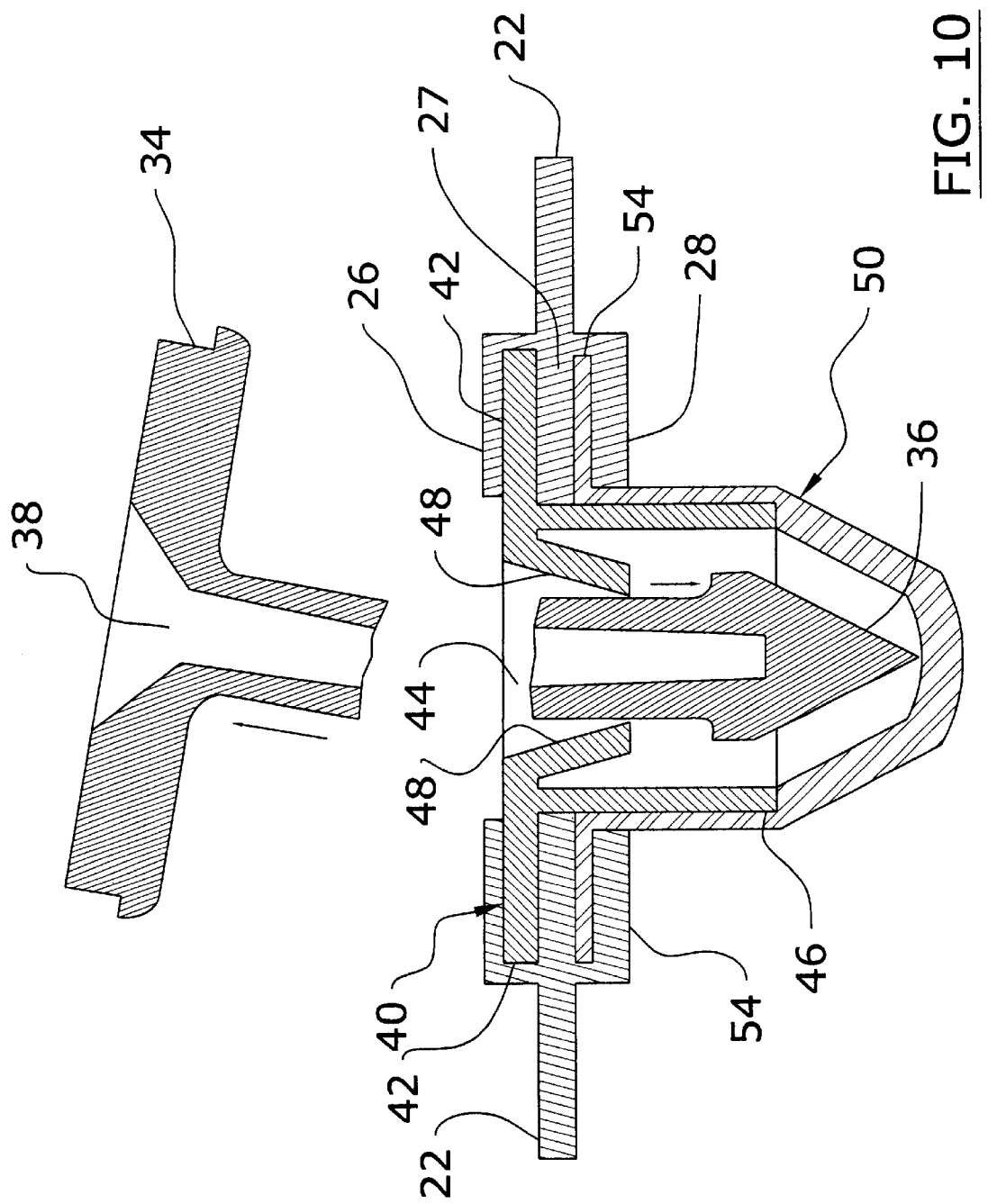
FIG. 10 is a side cutaway view of the main shaft of the attachment member cut with the spiked end remaining within the cavity of the receiving member to prevent insertion of a second attachment member.

As shown in FIGS. 5 through 8 of the drawings, an inner flange 48 is positioned within the first member 40 for catchably receiving the attachment member 30. The inner flange 48 is preferably tapered inwardly as shown in FIGS. 5 through 8 of the drawings. Alternative embodiments of the inner flange 48 are illustrated in FIGS. 9 and 10 of the drawings. FIG. 9 illustrates a solid and straight inner flange 48. FIG. 10 illustrates a straight inner flange 48. It can be appreciated that various other structures may be utilized to construct the inner flange 48.

As shown in FIGS. 2, 5, 6 and 7 of the drawings, the attachment member 30 is comprised of an elongate main shaft 32 having a flanged portion 34 attached to an end thereof. The flanged portion 34 may be comprised of various flanged structures for preventing the attachment member 30 from being pulled through the ear of an animal. The attachment member 30 preferably includes an applicator passage 38 extending into the main shaft 32 for receiving an applicator shaft of an applicator pliers 12. It can be appreciated that the attachment member 30 may be inserted through the ear and into the receiving member 60 utilizing various systems and devices.

The main shaft 32 of the attachment member 30 includes a spiked end 36 opposite of the flanged portion 34. The spiked end 36 has a portion broader than the main shaft 32 tapering inwardly as best shown in FIGS. 5 through 8 of the drawings. It can be appreciated that the main shaft 32 may include a broader end in place of the spiked end 36. The spiked end 36 is formed to be insertable within the first opening 44 of the receiving member 60 and catchably retained within the receiving member 60 by the inner flange 48 as shown in FIG. 6 of the drawings. The spiked end 36 may be comprised of various broad and tapered structures as can be appreciated. When the spiked end 36 of the attachment member 30 is fully inserted into the receiving member 60, the only method to remove the ear tag 20 from the ear of an animal is to cut the main shaft 32 thereby leaving the spiked end 36 and a portion of the main shaft 32 within the receiving member 60 which prevents the reapplying of another attachment member 30 for reinsertion into another animal's ear as shown in FIG. 8 of the drawings.

Figure 3:
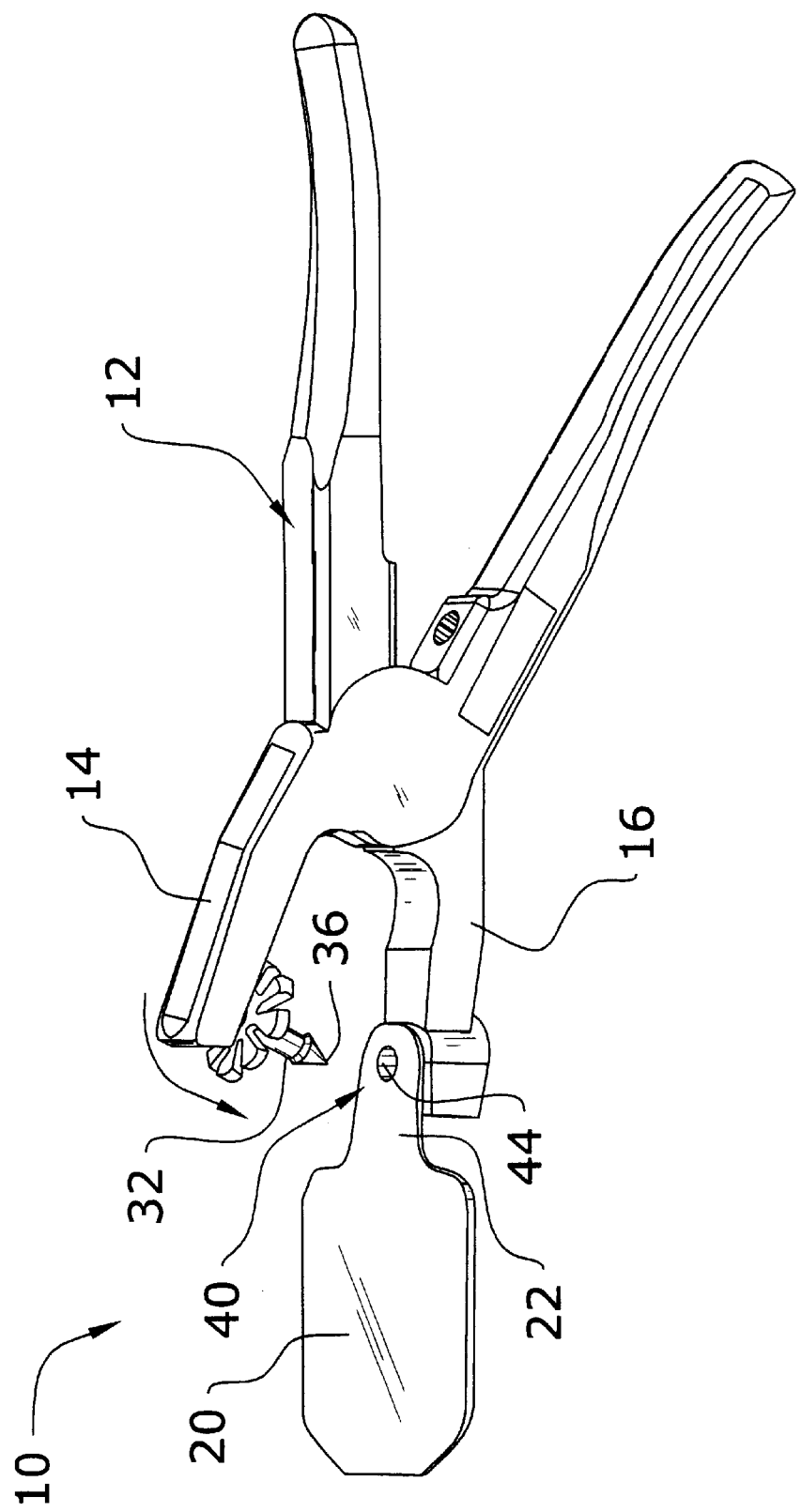
FIG. 3 is an upper perspective view of the present invention within an applicator pliers.
Figure 4:
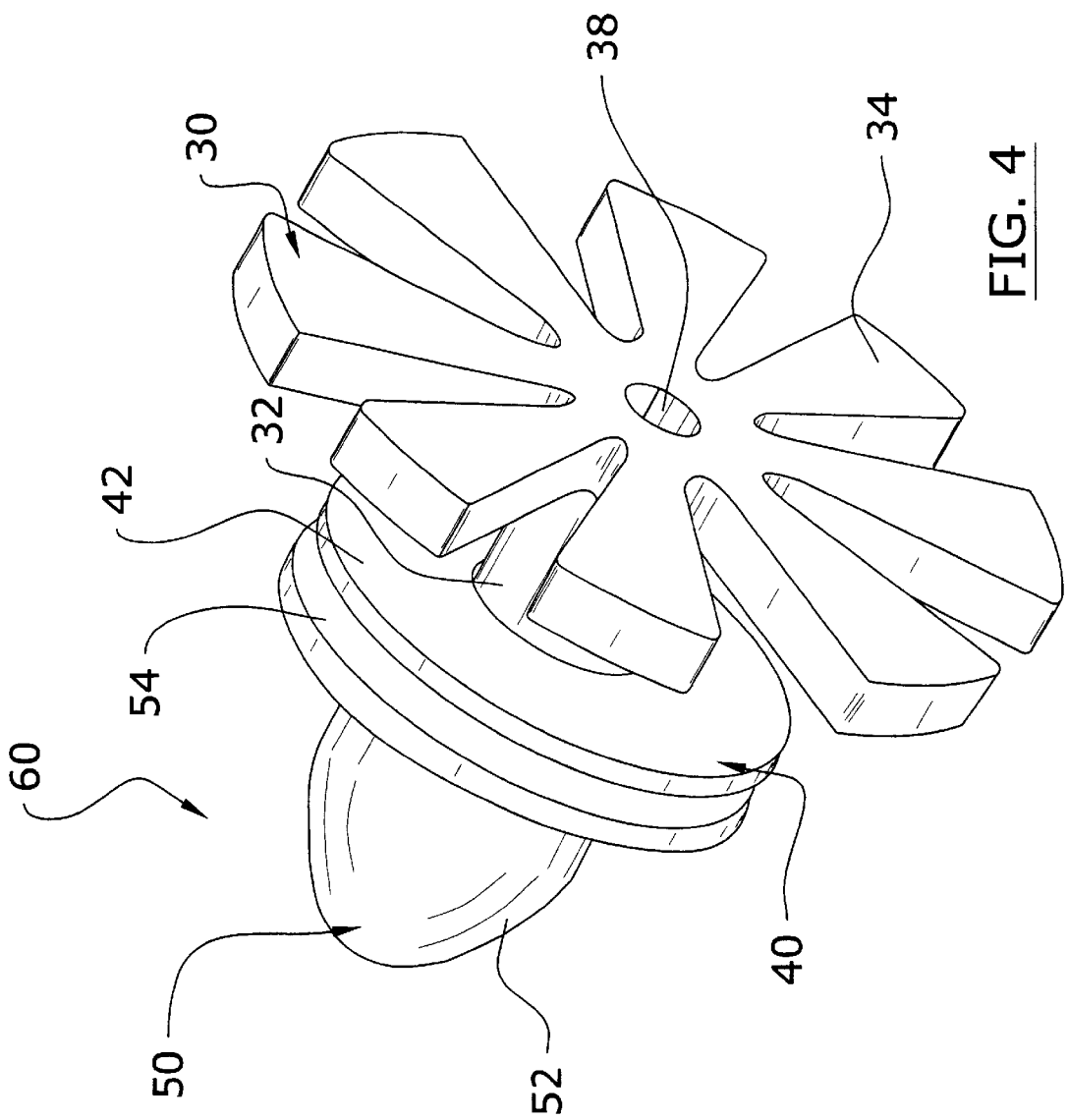
FIG. 4 is a magnified view of the attachment member permanently inserted within the receiving member.

In use, the user selects an ear tag 20 having the receiving member 60 secured within. The user positions the receiving member 60 within the second jaw 16 and an attachment member 30 within the first jaw 14 of the applicator pliers 12 as shown in FIG. 3 of the drawings. The user then positions the applicator pliers 12 about the ear of an animal and then compresses the applicator pliers 12 to extend the attachment member 30 through the ear of the animal into the receiving member 60. As the spiked end 36 of the attachment member 30 pierces the ear of the animal, the spiked end 36 is then aligned with and begins to penetrate the first opening 44 as shown in FIG. 5 of the drawings. The spiked end 36 is further driven through the inner flange 48 of the receiving member 60 until the head of the spiked end 36 passes by the inner flange 48 wherein a flat radial rim of the spiked end 36 engages the inner flange 48 and prevents removal of the attachment member 30 from the receiving member 60. The user then removes the applicator pliers 12 from the receiving member 60 and the attachment member 30 thereby leaving the ear tag 20 secured within the ear of the animal. If the user desires to remove the ear tag 20 from the animal after application thereof, the user must sever the main shaft 32 of the attachment member 30 thereby leaving the spiked end 36 and a portion of the main shaft 32 within the cavity 56 of the receiving member 60. The remaining spiked end 36 and main shaft 32 within the cavity 56 of the receiving member 60 prevents the insertion of a second attachment member 30 within the receiving member 60 effectively preventing the reattachment of the ear tag 20 to another animal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An ear tag system, comprising:

a receiving member attached to an ear tag;

an opening extending into said receiving member;

an inner flange within said receiving member; and an attachment member having a main shaft, a flanged portion, and a head portion, wherein said head portion is catchably receivable within said opening and said inner flange;

wherein said receiving member includes a flanged section with a slot wherein said flanged section extends outwardly from said receiving member, and wherein said ear tag includes a middle portion extending within said slot, a first portion and a second portion on opposing sides of said flanged section.

2. The ear tag system of claim 1, wherein said inner flange is tapered inwardly toward the main shaft of said attachment member.

3. The ear tag system of claim 2, wherein said opening is tapered inwardly.

4. The ear tag system of claim 3, wherein said head portion has a flat rim for catching upon said inner flange when attempted to be pulled from said receiving member.

5. The ear tag system of claim 4, wherein said head portion is comprised of a spiked end.

6. The ear tag system of claim 5, wherein said receiving member includes a cavity connected to said opening, wherein said cavity is formed for retaining a severed said main shaft and said head portion in a blocking position for preventing the insertion of a second attachment member.

7. The ear tag system of claim 1, wherein said inner flange is a straight structure.

8. The ear tag system of claim 1, wherein said head portion has a flat rim for catching upon said inner flange when attempted to be pulled from said receiving member.

9. The ear tag system of claim 1, wherein said head portion is comprised of a spiked end.

10. An ear tag system, comprising:

a receiving member attached to an ear tag, wherein said receiving member is comprised of a first member secured within a second member;

an opening extending into said receiving member;

an inner flange within said first member; and an attachment member having a main shaft, a flanged portion, and a head portion, wherein said head portion is catchably receivable within said opening and said inner flange;

wherein said receiving member includes a flanged section with a slot wherein said flanged section extends outwardly from said receiving member, and wherein said ear tag includes a middle portion extending within said slot, a first portion and a second portion on opposing sides of said flanged section.

11. The ear tag system of claim 10, wherein said inner flange is tapered inwardly toward the main shaft of said attachment member.

12. The ear tag system of claim 11, wherein said opening is tapered inwardly.

13. The ear tag system of claim 12, wherein said head portion has a flat rim for catching upon said inner flange when attempted to be pulled from said receiving member.

14. The ear tag system of claim 13, wherein said head portion is comprised of a spiked end.

15. The ear tag system of claim 14, wherein said receiving member includes a cavity connected to said opening, wherein said cavity is formed for retaining a severed said main shaft and said head portion in a blocking position for preventing the insertion of a second attachment member.

16. The ear tag system of claim 10, wherein said inner flange is a straight structure.

17. The ear tag system of claim 10, wherein said head portion has a flat rim for catching upon said inner flange when attempted to be pulled from said receiving member.

18. The ear tag system of claim 10, wherein said head portion is comprised of a spiked end.

19. An ear tag system, comprising:

a receiving member attached to an ear tag, wherein said receiving member is comprised of a first member secured within a second member;

an opening extending into said receiving member;

an inner flange within said first member; and an attachment member having a main shaft, a flanged portion, and a head portion, wherein said head portion is catchably receivable within said opening and said inner flange;

wherein said receiving member includes a flanged section with a slot wherein said flanged section extends outwardly from said receiving member, and wherein said ear tag includes a middle portion extending within said slot, a first portion and a second portion on opposing sides of said flanged section;

wherein said inner flange is tapered inwardly toward the main shaft of said attachment member;

wherein said opening is tapered inwardly;

wherein said head portion has a flat rim for catching upon said inner flange when attempted to be pulled from said receiving member;

wherein said head portion is comprised of a spiked end;

wherein said receiving member includes a cavity connected to said opening, wherein said cavity is formed for retaining a severed said main shaft and said head portion in a blocking position for preventing the insertion of a second attachment member;

wherein said inner flange is a straight structure;

wherein said head portion has a flat rim for catching upon said inner flange when attempted to be pulled from said receiving member;

wherein said head portion is comprised of a spiked end.

* * * * *